C. M. WILKINS.
Cheese-Vat.
No. { 145, / 1,248 }
Reissued Dec. 24, 1861.
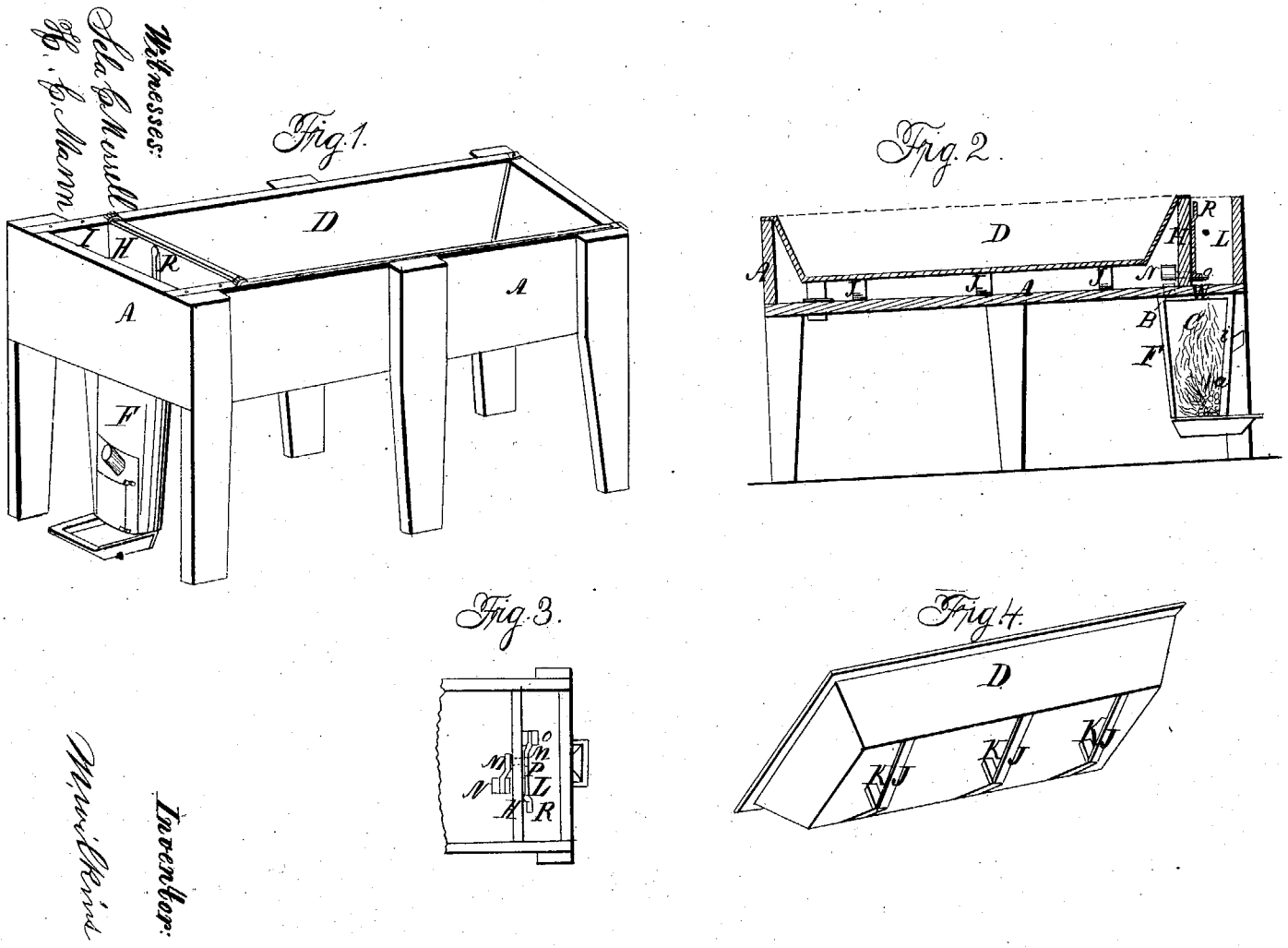
Witnesses:
Sela G. Merrell
H. G. Mann
Inventor:
M. Wilkins
N. PETERS, PHOTO-LITHOGRAPHER, WASHINGTON, D. C.

UNITED STATES PATENT OFFICE.

C. M. WILKINS, OF WEST ANDOVER, OHIO.

IMPROVEMENT IN CHEESE-VATS.

Specification forming part of Letters Patent No. 26,222, dated November 22, 1859; Reissue No. 1,248, dated December 24, 1861.

*To all whom it may concern:*

Be it known that I, C. M. WILKINS, of West Andover, in the county of Ashtabula and State of Ohio, have invented new and useful Improvements in Cheese-Vats; and I do hereby declare that the following is a full, clear, and exact description of the construction and operation of the same, reference being had to the annexed drawings, making a part of this specification, in which—

Figure 1 is a perspective view; Fig. 2, a longitudinal section. Figs. 3 and 4 are sections which will be referred to in description.

Like letters denote like parts in the several views.

My improvement in cheese-vats consists, in part, in the arrangement for regulating the supply of heat from a circulating water-heater to a cheese-vat.

The water-vat A and milk-vat D are made and combined in the usual way, except the water-vat is extended a little, which, after putting in the partition H at the termination of the milk-vat, forms the chamber L. The heater F is placed under this chamber and extends past the partition H under the vat. The heater is mader after a style very common. It is composed of two cylinders, *i* and *a*—one within the other—with a cap or head on one end of each. The other end of the cylinders are joined together, leaving a space between the cylinders and heads for water. There is an opening through both cylinders on one side for a door and smoke-pipe. The inside cylinder constitutes the fire-box C of the heater. There is a pipe or opening, B, connecting the water-chamber of the heater with that of the vat, and a pipe, W, connecting the heater with the chamber L in like manner. In connection with the pipes B and W are arranged two valves, N and O, Figs. 2 and 3. These two valves are attached to the shaft P by the arms M M, Fig. 3. This shaft passes through the partition H. To the shaft is also attached the lever R.

The valves are so arranged that when one is closed the other is open. By the action of the lever R the valves are operated so as to open or close either of the pipes B and W, or they may both be open at once. By the action of the lever the valve N, Figs. 2 and 3, may be so moved as to close the opening in the pipe B, which will exclude the passage of water from the heater to the vat, and allow the surplus heat from the heater to pass off through the pipe W into the chamber L or the open air.

I am aware that Reddington and McClure have received a patent for a device producing the same results; but it differs materially from my own in the following particulars: The apparatus of Reddington and McClure is so constructed that all surplus heat is discharged from the heater through the same channels that are used while heating the vat. Consequently it is necessary to introduce a cock into the pipe or pipes between the heater and vat to throw the heat in another direction when it is desirable to shut it off from the vat. The expense of a cock for this purpose, of sufficient capacity, together with the number of pipes necessary, their exposed condition, and consequent liability to get out of repair, are objectionable.

My improvement in cheese-vats consists, in part, in providing the bottom of an ordinary metallic cheese vat or tank with truss-braces, (designated by the letters J J J,) which extend across the bottom of the tank from one side to the other, and about in the center of these trusses, and connected with them and the bottom of the tank, is a brace, K, Fig. 4, which gives additional strength to the trusses. By means of these truss-braces the bottom or floor of the tank is very much strengthened. It is found in practice that the milk, &c., in the tank causes the floor of it to bulge and sink down, and a preponderance of pressure by water from below forces up the floor of the tank. Thus the floor of the tank is forced up or down, according to the pressure above or below. The milk-vat is necessarily made of very light material—usually of sheet-tin. When it is filled with milk, there is a great strain upon the seams or joints in the bottom of the vat. By placing these braces upon the seams of the bottom it prevents all working, as above stated, and is capable of sustaining all the pressure that is likely to be brought against it from above or below, which is not the case with any other appliance that I have known used. One or more of the braces K may be used, as the case may seem to require. Finally, the advantages of my cheese-vat are shown in the very compact arrangement of its parts, simplicity of operation, and cheapness of construction.

I disclaim the devices shown in the invention of Reddington and McClure.

I claim—

1. The arrangement of the pipe W, heater F, and chamber L, substantially as and for the purpose specified.

2. The combination of the valve N, arm M, to which it is attached, and the lever R, arranged for operating substantially as shown, and for the purpose described.

3. Arranging either or both of the valves N and O, in combination with their respective pipes, over the fire-box of the heater, substantially as and for the purpose specified.

4. The use of the truss-braces J J J, in the manner and for the purpose described and shown.

C. M. WILKINS.

Witnesses:
SELA C. MERRELL,
HIRAM C. MASON.